United States Patent [19]

Park

[11] Patent Number: 5,680,266
[45] Date of Patent: Oct. 21, 1997

[54] BIT-STREAM ALLOCATING AND RESTORING METHOD FOR DIGITAL VCR AND DATA COMPRESSING/ DECOMPRESSING APPARATUS USING THE SAME

[75] Inventor: Goo-man Park, Seoul, Rep. of Korea

[73] Assignee: Samsung Electronics Co., Ltd., Kyungki-Do, Rep. of Korea

[21] Appl. No.: 514,139

[22] Filed: Aug. 11, 1995

[30] Foreign Application Priority Data

Feb. 16, 1995 [KR] Rep. of Korea .................... 95-2916

[51] Int. Cl.$^6$ .................................................. G11B 5/09
[52] U.S. Cl. .............................. 360/48; 360/53; 386/112
[58] Field of Search ............................... 360/32, 48, 53; 358/335; 386/112, 124, 47, 46

[56] References Cited

U.S. PATENT DOCUMENTS 5,473,479 12/1995 Takakura ........................ 360/48

*Primary Examiner*—Thang V. Tran
*Assistant Examiner*—Alan Faber
*Attorney, Agent, or Firm*—Sughrue, Mion, Zinn, Macpeak & Seas, PLLC

[57] ABSTRACT

A method for allocating and restoring a bit-stream when the code amount of the bit-stream, generated as a result of variable-length encoding with respect to macro blocks included in a segment, exceeds an allowable segment capacity. The excess bit amount is maintained at its maximum in a range where compatibility with a conventional standard definition video cassette recorder (SD-VCR) is guaranteed, to thereby improve the quality of a reproduced image. The method for allocating the bit-stream includes steps for (a) allocating the bit-stream of each DCT block, generated as a result of quantizing and variable-length encoding the DCT coefficient of each DCT block, to DCT block within the macro block, (b) reallocating the bits remaining after step (a) to another DCT block within macro block, (c) reallocating the bits remaining after step (b) to another macro block within the segment, (d) reallocating the bits remaining after step (c) to another segment having the macro block of the same content as that of previous or following frame. In this method for allocating the bit-stream, when a remaining bit amount in a segment unit is generated, the remaining bit amount is propagated to an adjacent segment and is recorded therein so that deterioration of the reproduced screen can be prevented. A data compressing/decompressing apparatus suitable for performing the above-described method is also described.

15 Claims, 15 Drawing Sheets

LUMINANCE DCT BLOCK

COLOR DIFFERENCE DCT BLOCK

LUMINANCE DCT BLOCK

COLOR DIFFERENCE DCT BLOCK

FIG. 10A (PRIOR ART)

|   | 0 | 1 | 2 | 3 | 4 | 5 | 6 | 7 | h |
|---|---|---|---|---|---|---|---|---|---|
| 0 | 0 | 2 | 6 | 7 | 15 | 16 | 28 | 29 | |
| 1 | 3 | 5 | 8 | 14 | 17 | 27 | 30 | 43 | |
| 2 | 4 | 9 | 13 | 18 | 26 | 31 | 42 | 44 | |
| 3 | 10 | 12 | 19 | 25 | 32 | 41 | 45 | 54 | |
| 4 | 11 | 20 | 24 | 33 | 40 | 46 | 53 | 55 | |
| 5 | 21 | 23 | 34 | 39 | 47 | 52 | 56 | 61 | |
| 6 | 22 | 35 | 38 | 48 | 51 | 57 | 60 | 62 | |
| 7 | 36 | 37 | 49 | 50 | 58 | 59 | 63 | 64 | | v

FIG. 10B (PRIOR ART)

(SUM)

|   | 0 | 1 | 2 | 3 | 4 | 5 | 6 | 7 | h |
|---|---|---|---|---|---|---|---|---|---|
| 0 | 1 | 3 | 7 | 19 | 21 | 35 | 37 | 51 | |
| 1 | 5 | 9 | 17 | 23 | 33 | 39 | 49 | 53 | |
| 2 | 11 | 15 | 25 | 31 | 41 | 47 | 55 | 61 | |
| 3 | 13 | 27 | 29 | 43 | 45 | 57 | 59 | 63 | | v (DIFFERENCE)

|   | 0 | 1 | 2 | 3 | 4 | 5 | 6 | 7 |
|---|---|---|---|---|---|---|---|---|
| 4 | 2 | 4 | 8 | 20 | 22 | 36 | 38 | 52 |
| 5 | 6 | 10 | 18 | 24 | 34 | 40 | 50 | 54 |
| 6 | 12 | 16 | 26 | 32 | 42 | 48 | 56 | 62 |
| 7 | 14 | 28 | 30 | 44 | 46 | 58 | 60 | 64 | v

FIG. 11A (PRIOR ART)

|   | 0 | 1 | 2 | 3 | 4 | 5 | 6 | 7 | h |
|---|---|---|---|---|---|---|---|---|---|
| 0 | DC | 0 | 0 | 1 | 1 | 1 | 2 | 2 |   |
| 1 | 0 | 0 | 1 | 1 | 1 | 2 | 2 | 2 |   |
| 2 | 0 | 1 | 1 | 1 | 2 | 2 | 2 | 3 |   |
| 3 | 1 | 1 | 1 | 2 | 2 | 2 | 3 | 3 |   |
| 4 | 1 | 1 | 2 | 2 | 2 | 3 | 3 | 3 |   |
| 5 | 1 | 2 | 2 | 2 | 3 | 3 | 3 | 3 |   |
| 6 | 2 | 2 | 2 | 3 | 3 | 3 | 3 | 3 |   |
| 7 | 2 | 2 | 3 | 3 | 3 | 3 | 3 | 3 |   |
| v |   |   |   |   |   |   |   |   |   |

REGION 0, REGION 1, REGION 2, REGION 3

FIG. 11B (PRIOR ART)

(SUM)

|   | 0 | 1 | 2 | 3 | 4 | 5 | 6 | 7 | h |
|---|---|---|---|---|---|---|---|---|---|
| 0 | DC | 0 | 1 | 1 | 1 | 2 | 2 | 3 |   |
| 1 | 0 | 1 | 1 | 2 | 2 | 2 | 3 | 3 |   |
| 2 | 1 | 1 | 2 | 2 | 2 | 3 | 3 | 3 |   |
| 3 | 1 | 2 | 2 | 2 | 3 | 3 | 3 | 3 |   |

REGION 0, REGION 1, REGION 2, REGION 3

(DIFFERENCE)

|   | 0 | 1 | 2 | 3 | 4 | 5 | 6 | 7 | h |
|---|---|---|---|---|---|---|---|---|---|
| 4 | 0 | 0 | 1 | 1 | 2 | 2 | 2 | 3 |   |
| 5 | 0 | 1 | 1 | 2 | 2 | 2 | 3 | 3 |   |
| 6 | 1 | 1 | 2 | 2 | 2 | 3 | 3 | 3 |   |
| 7 | 1 | 2 | 2 | 2 | 3 | 3 | 3 | 3 |   |

REGION 0, REGION 1, REGION 2, REGION 3

BIT-STREAM ALLOCATING AND RESTORING METHOD FOR DIGITAL VCR AND DATA COMPRESSING/ DECOMPRESSING APPARATUS USING THE SAME

BACKGROUND OF THE INVENTION

1. Field of the Invention

The present invention relates to an allocation of a bit-stream generated as a result of a variable-length encoding in a standard-definition video cassette recorder (SD-VCR) and, more particularly, to methods for allocating and restoring the bit-stream when the code amount of bit-stream generated, as a result of the variable-length encoding, exceeds an allowable capacity of a segment. The excessive bits are reserved within the limits of compatibility with a conventional SD-VCR, to thereby improve the quality of the reproduced image. Data compressing/decompressing apparatuses for allocating and restoring the bit-stream when the code amount of bit-stream generated exceeds an allowable capacity of a segment, are also disclosed.

The instant application is based on Korean Patent Application No. 95-2916, which is incorporated herein by reference for all purposes.

2. Discussion of Related Art

With the development of digital signal processing technology, most information transfer media are being converted into digital form in order to provide a digital VCR providing a high quality image during multi-dubbing. In the digital VCR, a discrete cosine transform (DCT) block of input image is classified into one of four classes according to the activity, as discussed in greater detail below. The bits are adaptively allocated to each class so that the encoding capacity of the system is improved and the amount of data generated from each frame is maintained constant. Thus, according to an image compressing method of the conventional digital VCR, after dividing one frame into sub-frames (segments) having a predetermined size, each segment is independently encoded and the amount of data generated from each segment is maintained at a constant level.

Referring to FIG. 1, a SD-VCR includes an analog-to-digital (A/D) converter 10, a data compressor 12, an error correction encoder 14, a channel encoder 16, a reproducing circuit 18, an error correction decoder 20, a data decompressor 22 and a digital-to-analog (D/A) converter 24.

An input image signal is provided to data compressor 12 via A/D converter 10. The image digitized by A/D converter 10 has a sampling structure of a 4:4:2 format according to the CCIR recommendation 601. The image having a 4:4:2 format has a data rate of 167 Mbps on the basis of valid pixels. A sound signal is recorded as a pulse code modulation (PCM) signal without compression.

Data compressor 12 compresses screen data, according to the characteristics of Table 1, using a discrete cosine transform (DCT) and variable-length coding (VLC), to output the compress-encoded image data having a data rate of 24.948 Mbps. Error correction encoder 14 adds an error correction code to compressed video data, uncompressed sound data, a sub-code and auxiliary data, respectively, The data to which the error correction code is added is record-encoded by channel encoder 16 and is then recorded on magnetic tape. The data rate of recorded data is increased to 41.85 Mbps by the error correction encoding and channel encoding.

After an error generated during recording and reproducing is corrected with respect to the data reproduced by reproducing circuit 18, via error correction decoder 20, the image and sound signals are restored via data decompressor 22 and D/A converter 24.

TABLE 1

| | |
|---|---|
| recording mode: | rotary azimuth recording |
| image sampling frequency: | Y = 13.5 MHz, $C_r$, $C_b$ = 6.75 MHz |
| image input format: | 4:1:1(525/60), 4:2:0(625/50) |
| data compression method: | DCT, VLC, encoding within screen |
| data rate after compressing: | 24.948 Mbps |
| audio signal recording mode: | (PCM digital recording) |
| sampling frequency/bit number/channel | 48 kHz/16/2, 44.1 kHz/16/2, 32 kHz/16/2, 32 kHz/12/4 |
| error correction code: | Reed-Solomon product code |
| recording code: | scrambled I-NRXI, 24–25 converting code |
| recording data rate: | about 42 Mbps |
| detecting method: | partial response class 4 |
| drum rotating speed: | 9000 RPM |
| track width: | 10 μm |

FIG. 2 is a diagram showing the track structure of a conventional SD-VCR. It will be noted that the track of a SD-VCR is classified as an insert and track information (ITI) sector 200, an audio sector 202, a video sector 204 and a sub-code sector 206, in sequence, beginning from a track starting point where a head starts scanning. Gaps G1, G2, G3 are used to separate the sectors.

ITI sector 200 has an ITI pre-amble region 208, a start-sync block region 210, a track information region 212 and ITI post-amble region 214. ITI sector 200 provides track information and location information of data for editing. A time interval of detected information is calculated so that the location of image, sound and sub-code is detected.

Audio sector 202 has an audio pre-amble region 216, 14 audio data sync block region 218 and an audio post-amble region 220. Video sector 204 has a video pre-amble region 222, 149 video data sync block region 224 and a video post-amble region 226.

Sub-code sector 206 has a sub-code pre-amble region 228, a sub-code region 230, a sub-code post-amble region 232 and an overwrite margin 234. In the sub-code, auxiliary data such as a recording date and time are recorded. The sub-code sector 206 is read in synchronization with the image and sound recorded in the tape. Subtitle and screen commentary can be recorded in the sub-code. High speed searching (200 times) can also be performed using part of the sub-code.

The head helically scans from the lower end to the upper end of each track. When a tape is scanned at a speed of 18.831 mm per second, the track slope is 9.1668°. One frame of a 525/60 Hz image signal is recorded in ten tracks as shown in FIG. 3A, and one frame of a 625/50 Hz image signal is recorded in twelve tracks as shown in FIG. 3B. In each recording track, an azimuth recording is performed to prevent disturbance between neighboring recording tracks. Here, the azimuth angle is ±20°.

The necessary capacity of an input image signal having a 4:1:1 or 4:2:0 format is about five times as much as the recording capacity of a SD-VCR. Thus, a signal compressing or restoring technique is required. An image compression technique used in a VCR should reflect tape characteristics and guarantee editing and trick-play functions and minimum error propagation. In order to achieve these functions, since the tape is a sequentially accessed medium, the encoding should be independently performed on a small image unit within a screen or frame.

According to a current standard, a segment is an independent compression-encoding unit. One segment includes five macro blocks. During the decoding process, at least one macro block can be independently decoded so that error propagation is reduced and effective trick play can be performed since as much of the macro block as possible is restored.

FIG. 4 is a block diagram showing a detailed structure of the data compressor shown in FIG. 1. In FIG. 4, the data compressor includes a frame memory 30, a DCT converter 32, a motion amount detector and DCT mode determiner 34, a quantizer 36, a bit amount controller 38, a variable-length encoder 40, a shuffler 42, a bit-stream allocator 44 and a deshuffler 46.

A SD-VCR uses a DCT VLC compression method. The image signal input to frame memory 30 has a 4:2:2 or 4:2:0 format. A luminance signal (Y) and color difference signals ($C_r$ and $C_b$) are sampled at 13.5 MHz and 6.75 MHz, respectively. In the case of a 525/60 Hz signal, the color difference signals are 2:1 sub-sampled in the horizontal direction to become a 4:2:2 format, and in the case of a 625/50 Hz signal, a scanning line of two color difference signals is reduced to one half according to line sequence in the vertical direction so that a signal having a 4:2:0 format is produced.

FIG. 5 is a diagram showing a process for generating an image signal of a 4:2:0 format according to the CCIR recommendation 601. In the case of a 525/60 Hz (or 625/50 Hz) signal, the size of the luminance signal Y is 720 (or 720) pixels in width and 480 (or 576) lines in length, and the size of two color difference signals $C_r$, $C_b$ is 180 (or 360) pixels in width and 480 (or 288) lines in length. One DCT block includes 8×8 pixels. Since an incomplete 4×8 (half-size) block occurs at the right end of every line in the case of the color difference signals $C_r$, $C_b$ of 525/60 Hz, one block is formed by using a signal pair (upper and lower signals).

Thus, in the case of a 525/60 Hz (or 625/50 Hz) signal, the Y signal is 90 (or 90) DCT blocks in width and 60 (or 36) DCT blocks in length. The color difference signals $C_r$, $C_b$ are 22.5 (or 45) DCT blocks in width and 60 (or 36) blocks in length (see FIGS. 6A and 6B).

As shown in FIGS. 7A and 7B, the macro block includes four Y blocks (which are located in the same position of the screen), one $C_r$ block, and one $C_b$ block. The macro block is a basic unit for the shuffling and for determining a quantized value.

FIG. 8 is a diagram showing a shuffling step in the case of a 525/60 Hz signal. Five vertical regions from A to E are provided and each region is divided into ten sub-regions. Here, each sub-region is called a super block. Each super block is 27 macro blocks. Thus, one frame screen is 50 super blocks, ten vertically and five horizontally, and in the case of a 625/50 Hz signal, 60 super blocks, twelve vertically and five horizontally, represents one frame screen. The super blocks included in the vertical region are sequentially recorded on the same track of the tape.

As shown in FIG. 8, a segment is formed by taking one macro block from each vertical region after evenly dividing a one-frame screen into five regions in the vertical direction, in the order: C, B, D, A and E. This sequence is determined according to the visual importance of each vertical region. As many segments as the number of macro blocks included in the super block are generated. Since one segment includes screen pieces distributed in the various positions, there is a high probability that the amount of information in each segment is about the same. When the amount of information is more constant, the code amount can be effectively fixed. The above process, whereby the whole screen is mixed by macro block units, is called "shuffling." The compression encoding is independently performed in segment units and the generated code amount is the same for each segment.

When constructing a segment, the macro blocks are shuffled but the macro blocks return to their initial position just before recording. This is called deshuffling. The reason for deshuffling is for maximally allocating the data read during a high speed reproduction in sequence so as to construct a visually better picture.

The picture in the high reproduction mode forms a mosaic by virtue of the sub-pictures distributed into a plurality of tracks. The screen quality deterioration during the trick-play can be prevented greatly by fixing the code amount per segment.

In FIG. 9, five super blocks in the horizontal direction are recorded in one track. Since ten rows exist in the vertical direction, one screen is recorded in ten tracks. 135 sync blocks in one track, for an image recording, are respectively matched with 135 macro blocks from five super blocks.

In the SD-VCR, the DCT block size is varied according to the motion information. If the motion is less, an 8×8 DCT block is taken. On the other hand, if the motion is great, two 4×8 DCT blocks are taken by calculating the sum and difference between two vertically adjacent pixels. FIGS. 10A and 10B show an 8×8 DCT block and a 2×4×8 DCT block, respectively.

The range value of each coefficient is differently reduced by multiplying each DCT block by the corresponding weigh matrix. As the frequency component is increased, the value of the weight matrix is decreased. Each DCT block is classified into one of four classes.

Class 0: A DCT block in which quantization noise is visible and the maximum absolute value of AC coefficients is less than or equal to 255.

Class 1: A DCT block in which the visibility of the quantization noise is lower than Class 0 and the maximum absolute value of AC coefficients is less than or equal to 255.

Class 2: A DCT block in which the visibility of the quantization noise is lower than Class 1 and the maximum absolute value of AC coefficients is less than or equal to 255.

Class 3: A DCT block in which the visibility of the quantization noise is lower than Class 2 or the maximum absolute value of AC coefficients is greater than 255.

The AC component in a DCT block is classified into four regions (region 0 to region 3) and the coefficients within the same region are quantized by the same quantization step. The class and regions in the DCT block are factors for determining the quantization step. Each quantization step is a power value of two (1, ½, ¼, etc). FIGS. 11A and 11B show classified regions of an 8×8 DCT block and a 2×4×8 DCT block, respectively.

The quantized DCT coefficients are reallocated from lower frequency to higher frequency in one dimension. A direct current (DC) coefficient is encoded as nine bit and an alternating current (AC) coefficient is encoded as two-dimensional Huffman code according to size.

Thirty DCT blocks exist in one segment and the classified thirty recording regions are provided. All recording regions take the Huffman code generated from their own DCT block first. The remaining bit amount is recorded in the recording region of another DCT block in the same macro block. When the recording in the macro block is completed, the recording is performed among five macro blocks by properly giving and taking the bit according to an excess or short state. Even if the remaining recording region exists after the Huffman code representing thirty blocks is received, the retaining recording region cannot be used again. On the other hand, if the recording region is short, the remaining bits are discarded. As described above, each segment is independently encoded.

In the conventional digital VCR, the data is compressed until the quality of a reproduced picture cannot be not lowered without going below a predetermined level. Thereafter, the remaining data are discarded, in order, from data whose effect with respect to the quality of the reproduced picture is less, so that the amount of data per segment is maintained at a constant level.

Generally, as the activity of the input image becomes larger, the amount of generated data becomes greater. However, since the amount of data per segment is fixed in the conventional digital VCR, as the activity of the input image increases, the quality of the reproduced image decreases.

SUMMARY OF THE INVENTION

The present invention was motivated by a desire to solve the above-identified problems.

An object of the present invention is to provide a method for allocating a bit-stream, in which the quality of the reproduced image is maintained by maximally using the bit-stream resulting through a variable-length coding process.

Another object of the present invention is to provide a method for restoring a bit-stream, suitable for use in conjunction with the above bit-stream allocating method.

Still another object of the present invention is to provide a data compressing apparatus suitable for preforming the above-mentioned allocating method.

Yet another object of the present invention is to provide a data decompressing apparatus suitable for performing the above-mentioned restoring method.

These and other objects, features and advantages according to the present invention are provided by a method for allocating a bit-stream of a standard definition video cassette recorder (SD-VCR) into a fixed-length segment. The segment includes a plurality of macro blocks each having a plurality of DCT blocks. The bit-stream is generated as a result of quantizing and variable-length-encoding DCT coefficient of each DCT block. In an exemplary case, the allocating method includes steps for (a) allocating the bit-stream of each DCT block, generated as a result of quantizing and variable-length encoding the DCT coefficient of each DCT block, to DCT block within the macro block, (b) reallocating the bits remaining after step (a) to another DCT block within macro block, (c) reallocating the bits remaining after step (b) to another macro block within the segment and (d) reallocating the bits remaining after step (c) to another segment having the macro block of the same content as that of previous or following frame.

These and other objects, features and advantages according to the present invention are provided by a method for restoring a bit-stream of a standard definition video cassette recorder (SD-VCR) where the bit-stream is the result of quantizing and variable-length-encoding the DCT coefficient of a DCT block in an allocated segment after being classified into the levels of a DCT block, a macro block and a segment. The restoring method includes steps for (a) determining whether the macro block having an incomplete bit-stream exists in the segment, (b) restoring the remaining bit-stream from another macro block in the segment when it is determined in step (a) that the macro block having an incomplete bit-stream exists, (c) searching for a segment having an error-processed macro block in the searching region when the macro block having an incomplete bit-stream is not completely restored during step (b) and (d) restoring the incomplete bit-stream in the segment identified in step (c), using the bit-stream included in the error-processed macro block.

These and other objects, features and advantages according to the present invention are provided by a data compressing apparatus for a standard definition video cassette recorder (SD-VCR). The apparatus compresses a bit-stream generated by quantizing and variable-length-encoding the DCT coefficient of a DCT block in an allocated segment after being classified into the levels of a DCT block, a macro block and a segment. The apparatus includes a frame memory, a DCT converter, a motion amount detector and DCT mode determiner, a quantizer, a bit amount controller, a variable-length encoder, a shuffler, a bit-stream allocater and a deshuffler. Advantageously, the apparatus further includes a macro block searching for searching a macro block having the same content in the searching region of a previous or following frame, and STA value setting for calculating the location difference between the macro block identified in the macro block searching and the currently processed macro block. The STA value is provided to the bit-stream allocator.

These and other objects, features and advantages according to the present invention are provided by a data decompressing apparatus of a standard definition video cassette recorder (SD-VCR), for decompressing a bit-stream, which is generated by quantizing and variable-length-encoding the DCT coefficient of a DCT block in an allocated segment after being classified into the levels of a DCT block, a macro block and a segment. The apparatus includes a shuffler for reconstructing a segment from the reproduced data, a bit-stream inverse allocator for extracting the variable-length-encoded data and STA information from the segments output from the shuffler, a variable-length decoder receiving the variable-length-encoded data output from the bit-stream inverse allocator, a circuit restoring the image signal of a time region by performing an inverse DCT conversion with respect to the variable-length-decode data thereby producing the restored image signal, a deshuffler for deshuffling the data of a macro block unit, which data has been converted, to return the inverse-DCT-converted coefficient to the initial position, and thereby providing the result, a concealment processor for receiving STA information output from the bit-stream inverse allocator and for generating the location information corresponding to the macro block in which an error is generated in a previous or following frame, and a frame memory for determining whether the error is generated in the macro block provided from the deshuffler, thereby providing the result.

These and other objects, features and advantages of the invention are disclosed in or will be apparent from the following description of preferred embodiments.

BRIEF DESCRIPTION OF THE DRAWINGS

The above objects and advantages of the present invention will become more apparent by describing in detail preferred embodiments thereof with reference to the attached drawings in which:

FIGS. 10A and 10B show an 8×8 DCT block and a 2×4×8 DCT block, respectively;

FIGS. 11A and 11B show divided regions of an 8×8 DCT block and a 2×4×8 DCT block, respectively;

DETAILED DESCRIPTION OF THE PREFERRED EMBODIMENT

As described above, in the conventional SD-VCR, the bit amount of the currently encoded segment is excessive, the bit amount is reduced by changing the quantization step until the screen quality of a predetermined level is guaranteed, with the still remaining bits being discarded. Thus, the quality of the reproduced screen having a large bit amount, such as in the case of a high-activity screen, is lowered.

Figure 1:
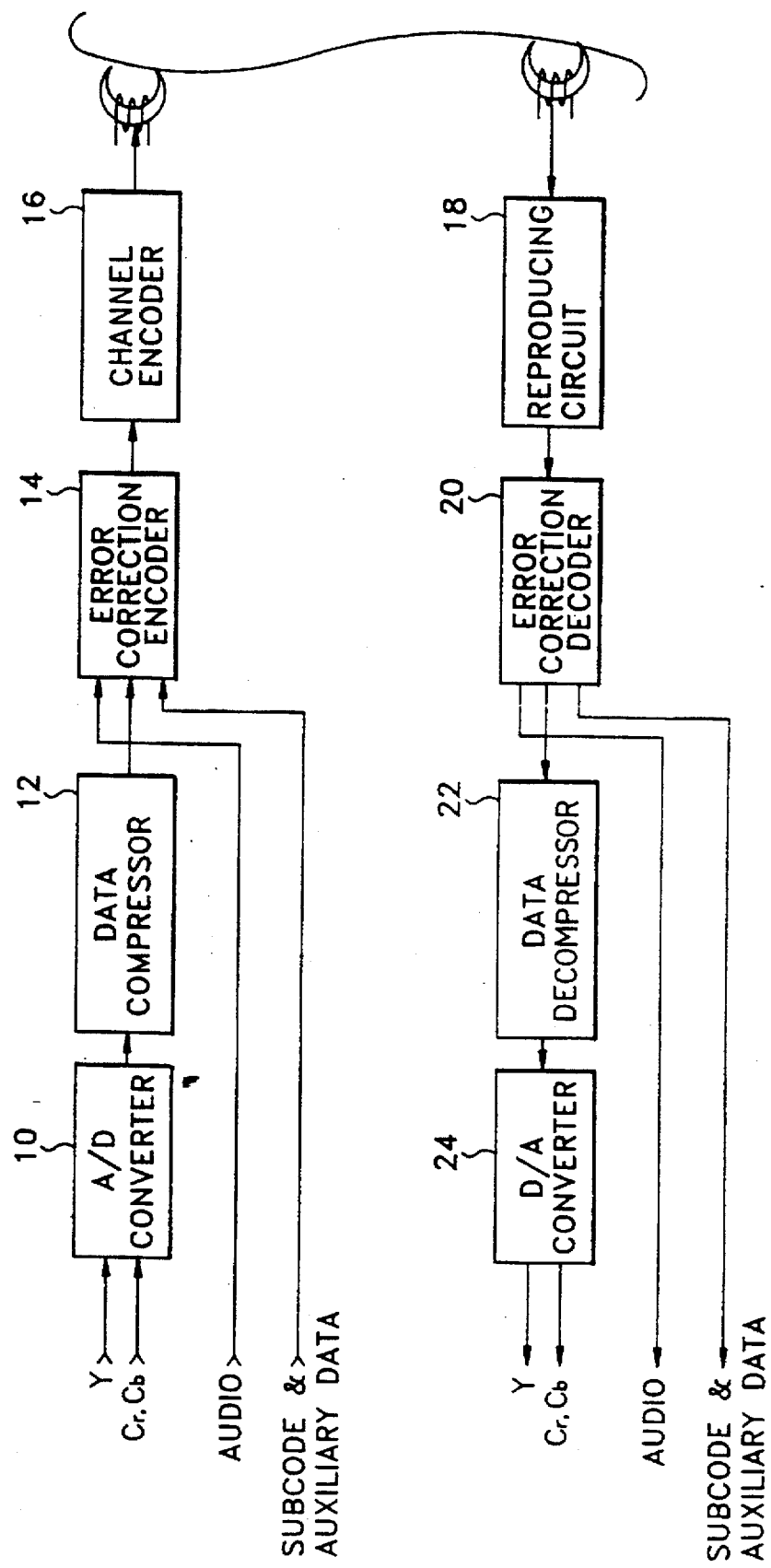
FIG. 1 is a block diagram showing the overall construction of a conventional standard definition video cassette recorder (SD-VCR)
Figure 2:
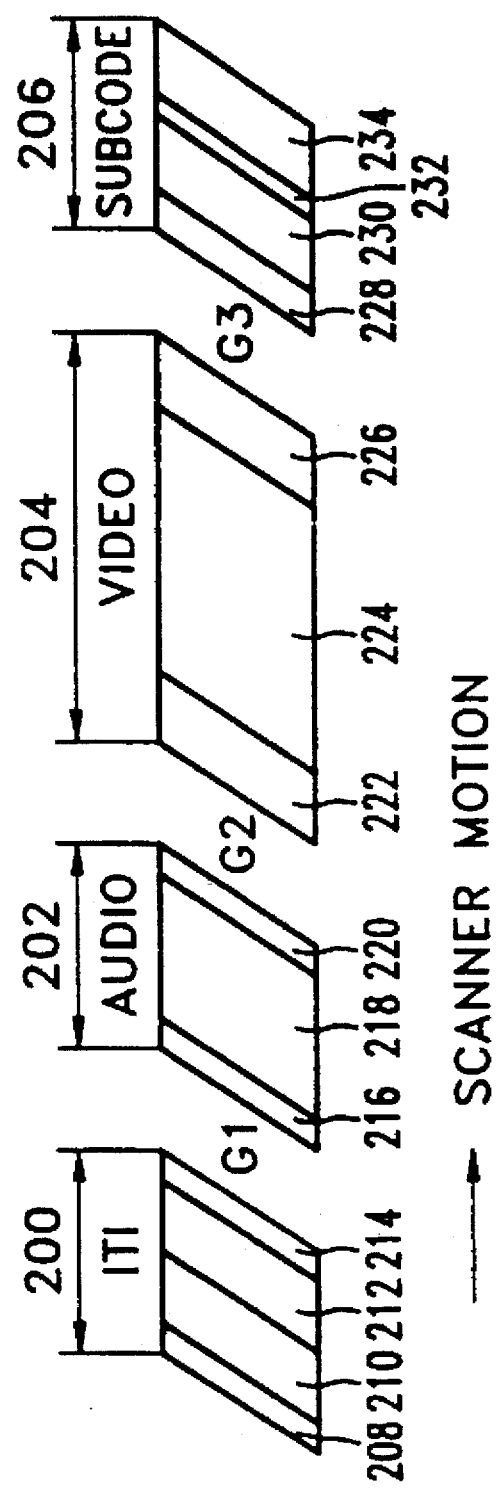
FIG. 2 is a diagram showing a track structure of the conventional SD-VCR.
Figure 3A:
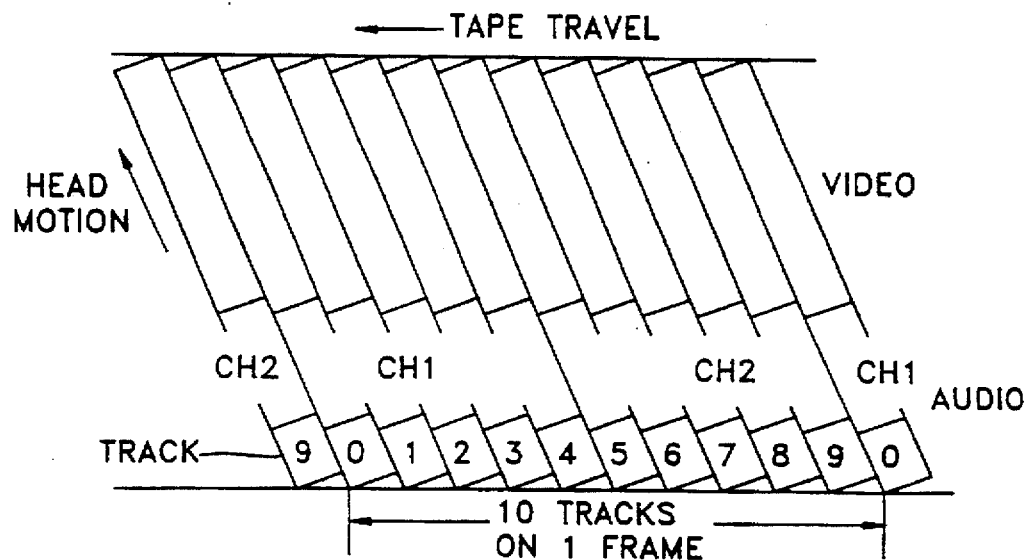
FIGS. 3A and 3B are diagrams showing track structures where a 525/60 Hz signal and a 615/50 Hz signal are recorded, respectively.
Figure 3B:
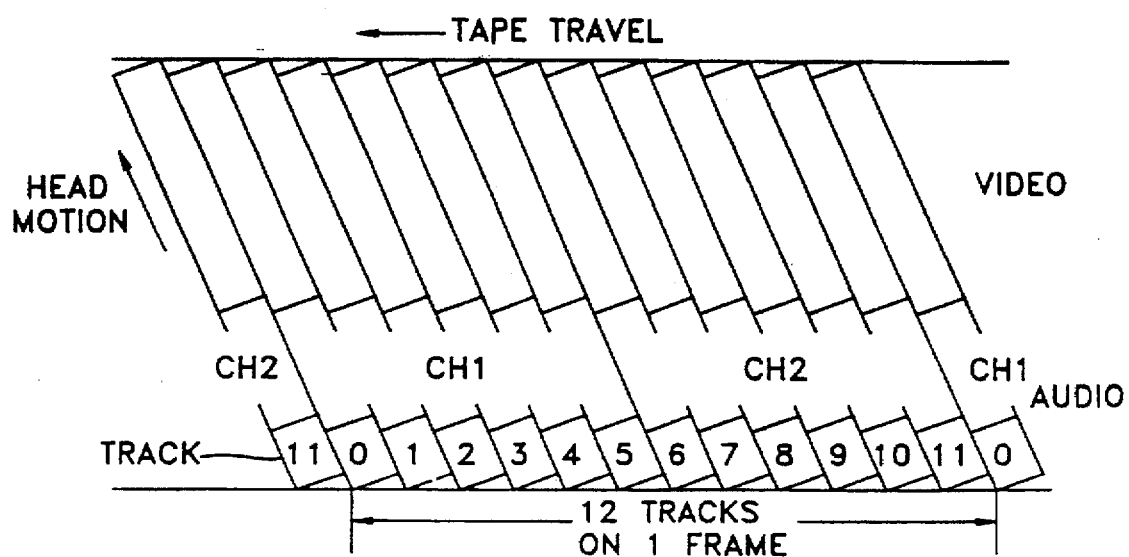
Figure 4:
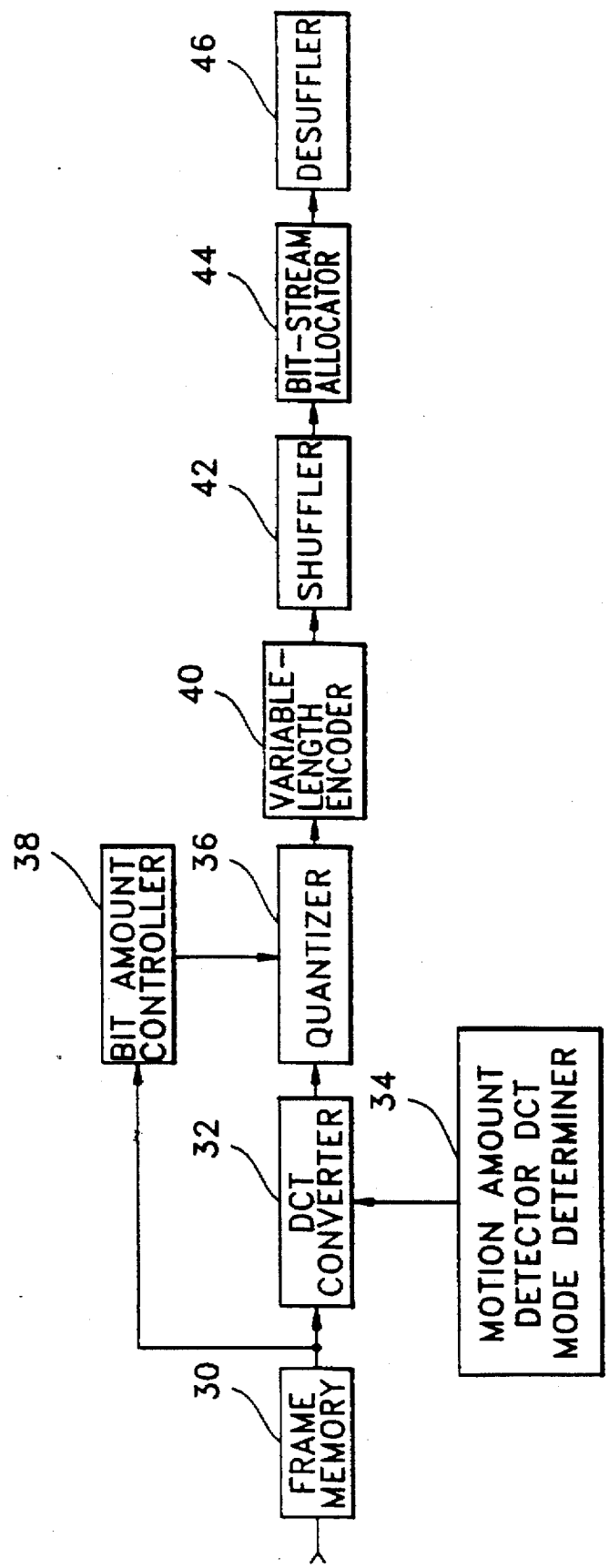
FIG. 4 is a block diagram showing a detailed structure of the data compressor shown in FIG. 1.
Figure 5:
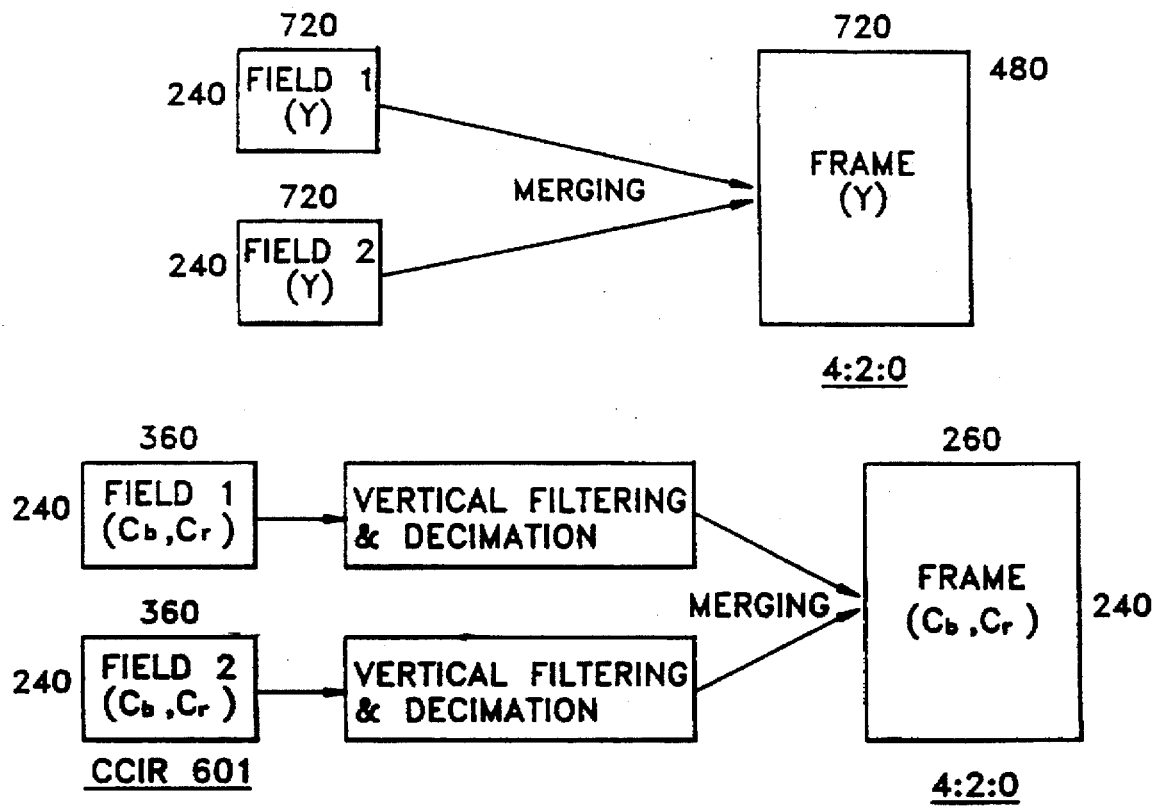
FIG. 5 is a diagram showing a process for generating an image signal of a 4:2:0 format according to the CCIR recommendation 601.
Figure 6A:
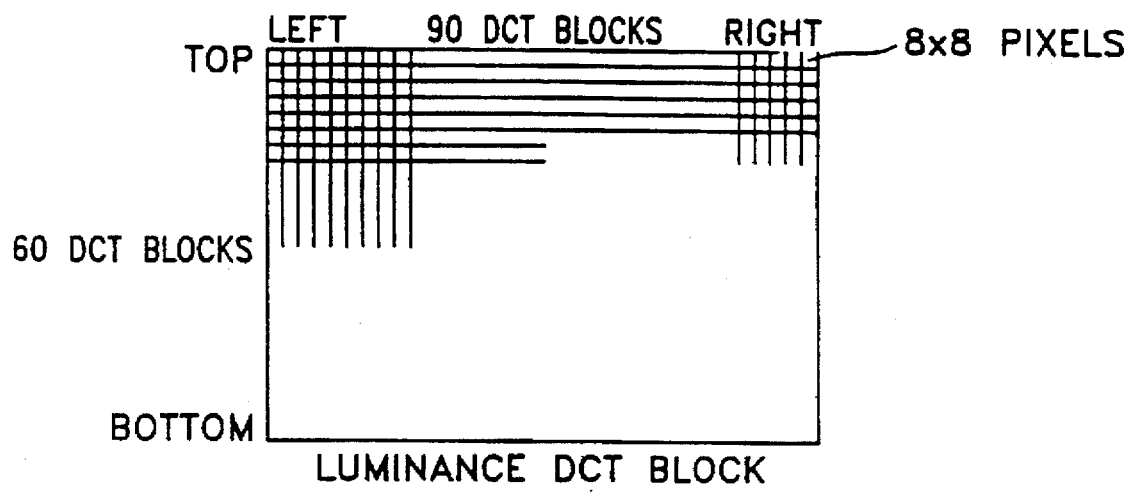
FIGS. 6A and 6B show a frame structure of a 4:2:2 format signal and a 4:2:0 format signal as macro block units, respectively.
Figure 6A:
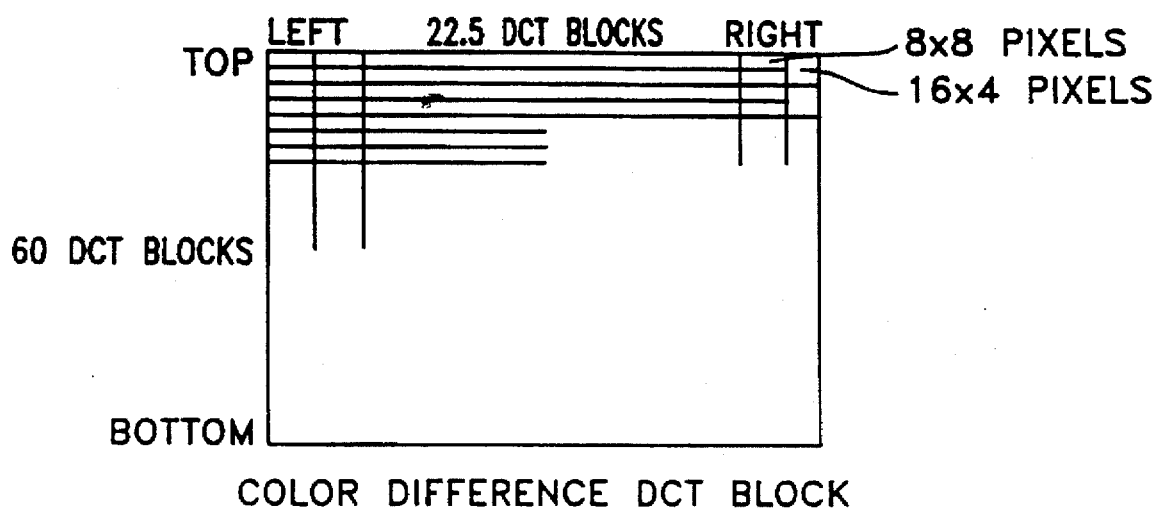
Figure 6B:
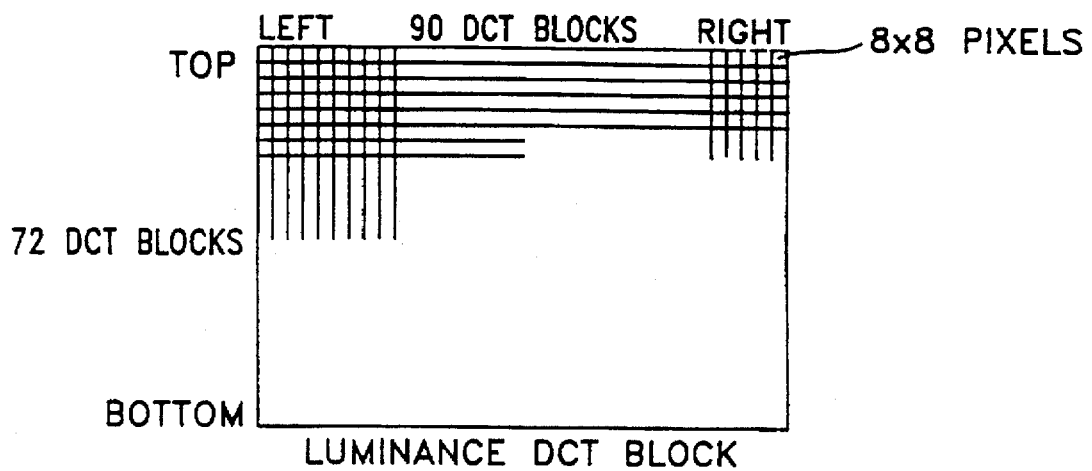
Figure 6B:
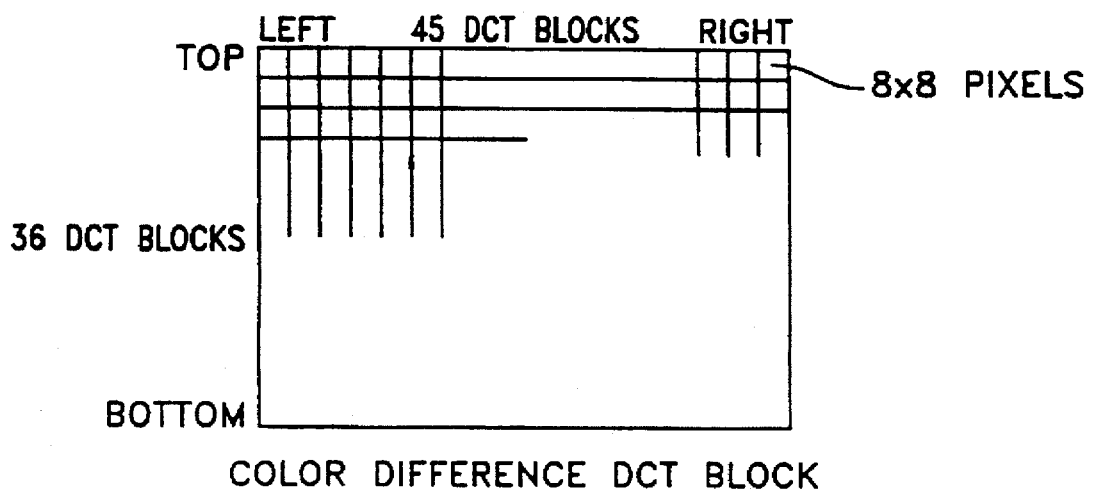
Figure 7A:
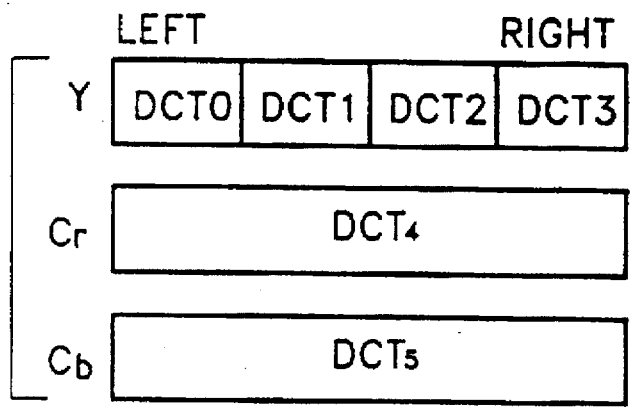
FIGS. 7A and 7B show a macro block of a 4:2:2 format signal and a 4:2:0 format signal, respectively.
Figure 7B:
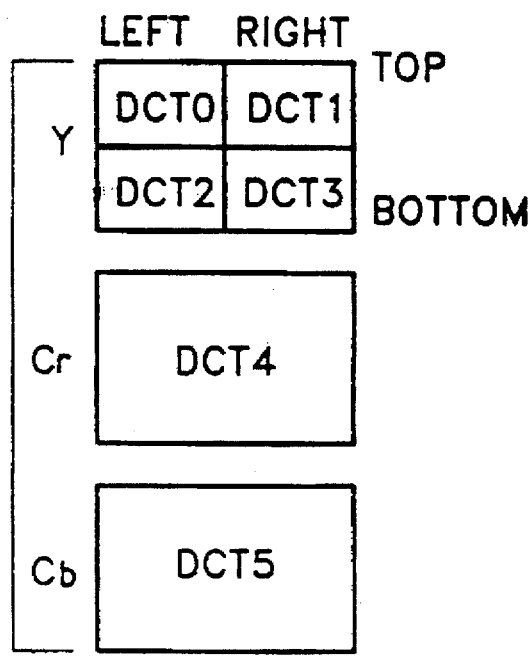
Figure 8:
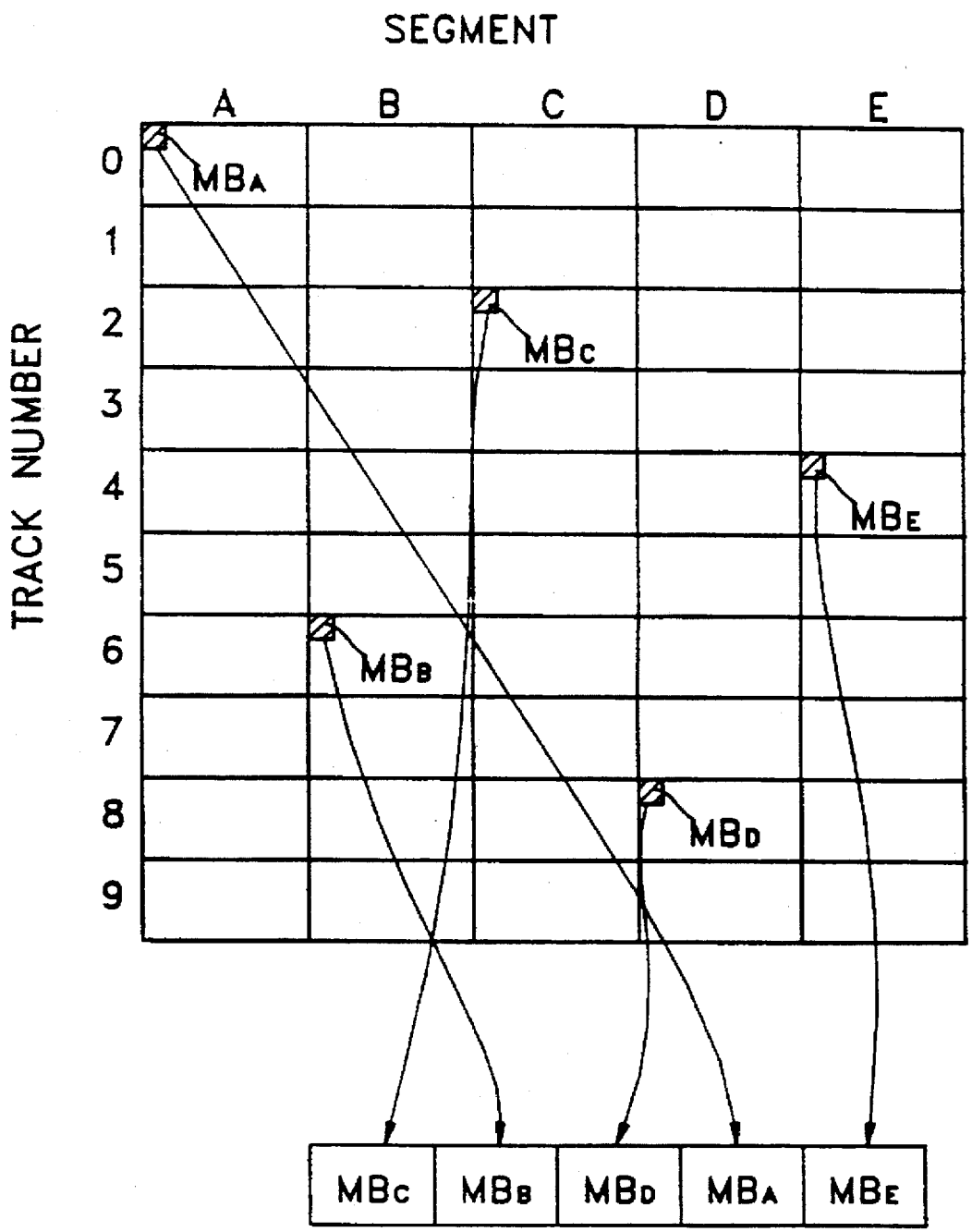
FIG. 8 is a diagram showing a shuffling step for a 525/60 Hz signal.
Figure 9:
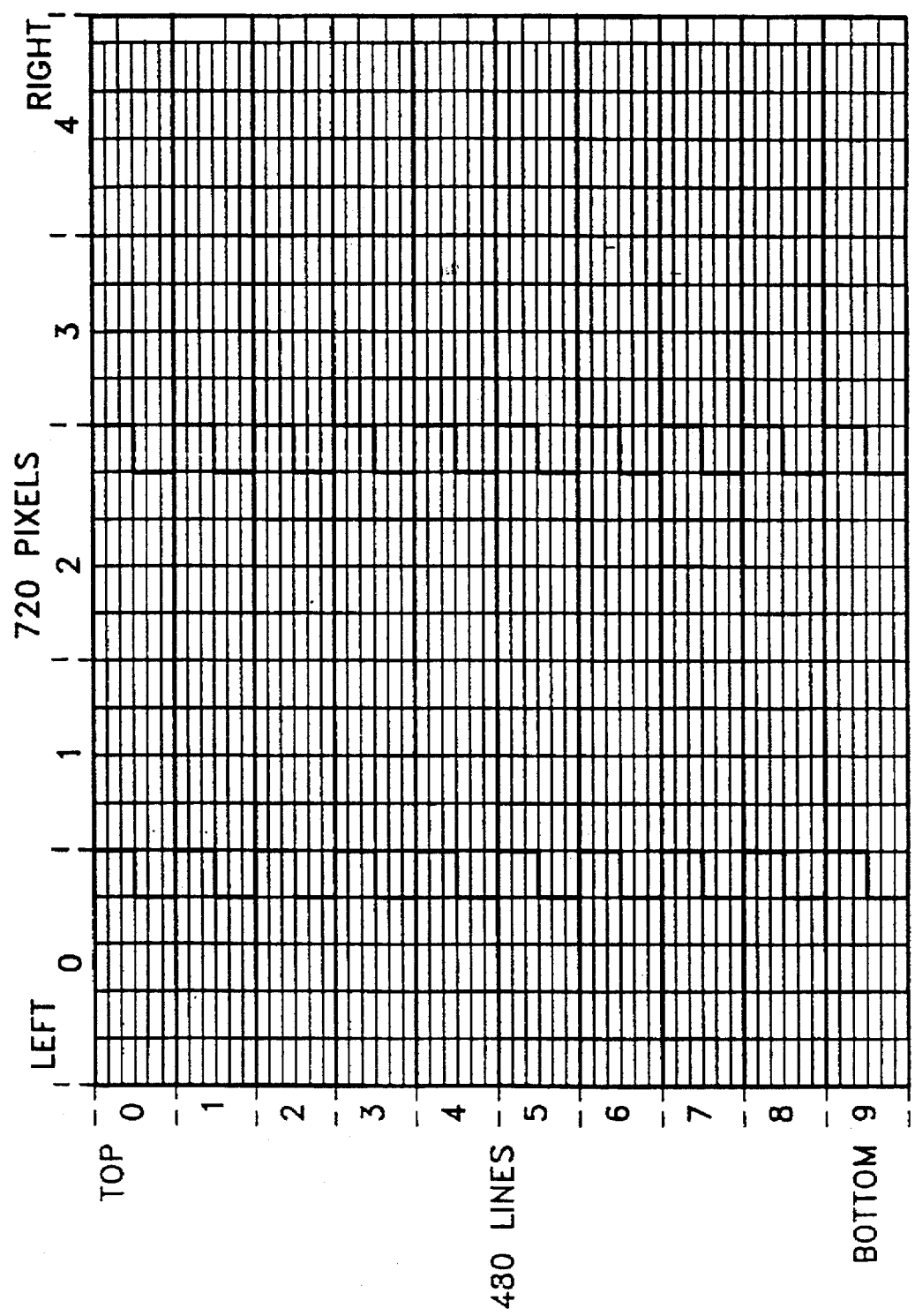
FIG. 9 is a diagram showing division of a region for constructing segments.
Figure 12:
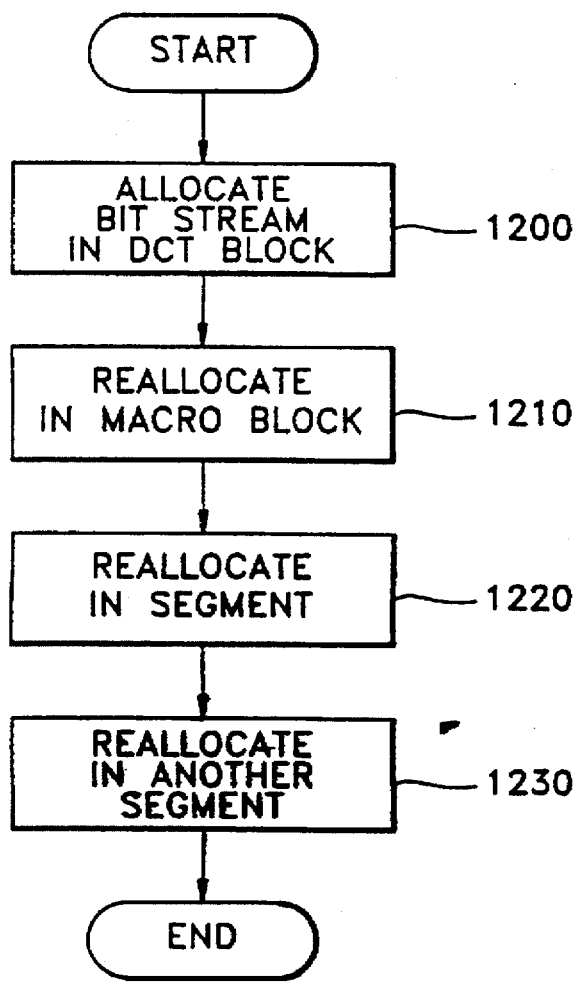
FIG. 12 is a flow chart for illustrating a method for allocating a bit-stream according to the present invention.

FIG. 12 is a flow chart for illustrating a method for allocating a bit-stream according to the present invention. As shown in FIG. 12, the method for allocating a bit-stream according to the present invention includes the steps of allocating the bit-stream in a DCT block (step 1200), reallocating the remaining bit amount in the macro block (step 1210), reallocating the remaining bit amount in the segment (step 1220) and reallocating the remaining bits in another segment (step 1230).

In step 1200, the bit-stream of each DCT block generated as the result of quantizing and variable-length-encoding the DCT coefficient of each DCT block are allocated to a DCT block of the macro block. In step 1210, the remainder bits remaining after step 1200 are reallocated to another DCT block of the macro block. In step 1220, the residual bits remaining after step 1210 are reallocated among the macro blocks in the segment. In step 1230, the remnant bits remaining after step 1220 is reallocated in another segment having the macro block of the same content with that of previous or following frame.

Figure 13:
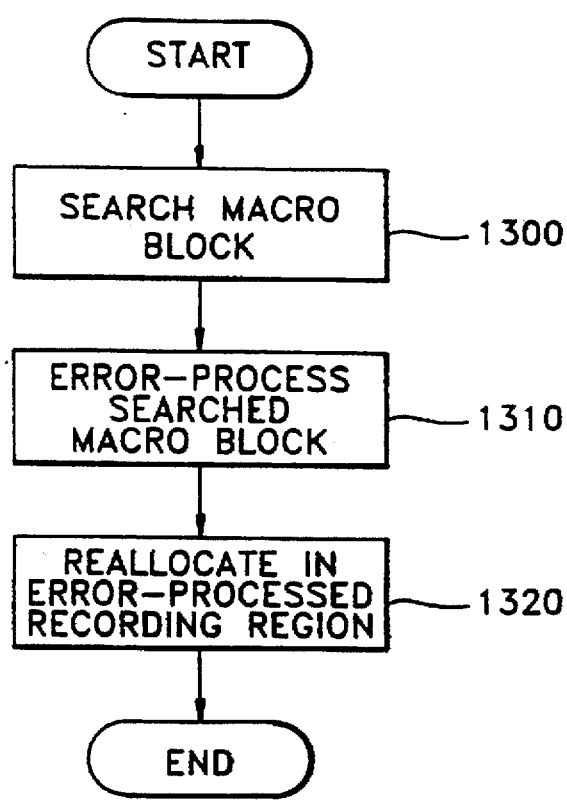
FIG. 13 is a flow chart for illustrating the step of FIG. 12 for reallocating the bit-stream in another segment.

FIG. 13 is a flow chart for illustrating step 1230 of FIG. 12. Step 1230 includes the steps of searching for the macro block (step 1300), error-processing the macro block (step 1310), and reallocating the remnant bits (step 1320).

In step 1300, a macro block having the same content as the macro block located in a defined searching space of a currently encoded frame is searched for in the searching space of a previous or following frame. In step 1310, the recording region corresponding to the searched macro block is error-processed in a segment including the macro block identified in step 1300. In step 1320, the remnant bits remaining after step 1310 are reallocated in the recording region error-processed in step 1310.

Figure 14:
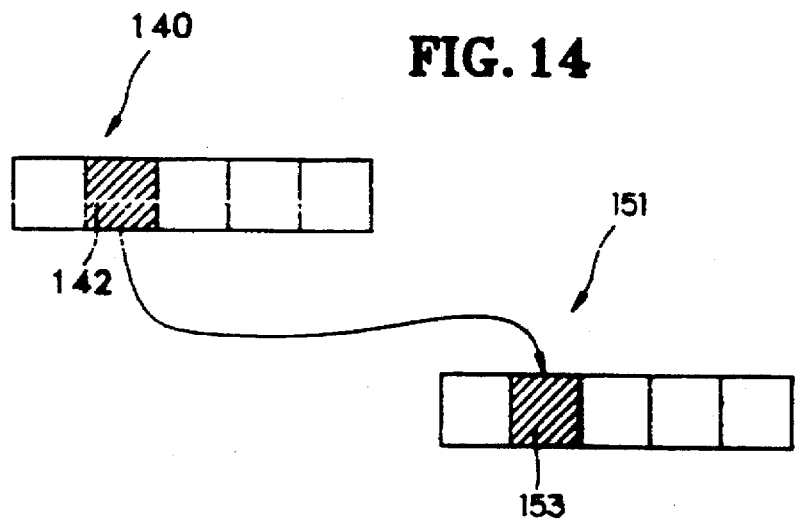
FIG. 14 graphically illustrates the method for allocating the bit-stream according to the present invention illustrated in FIG. 12.

FIG. 14 graphically depicts the method for allocating the bit-stream according to the present invention illustrated in FIG. 12. In FIG. 14, a first segment 140 and a second segment 151 each include five macro blocks. Preferably, first segment 140 has a macro block 142 in which an excess bit amount is generated, and second segment 151 has an identified macro block 153.

The excess bit amount of macro block 142 is recorded in the identified macro block 153. An end-of-block (EOB) code is not attached to macro block 142 in which the excess bit amount is generated so that it can be readily known that the excess bit amount exists therein. In identified macro block 153, the location information of corresponding macro block 142 is recorded using a special STA code. When the macro block without an EOB code is generated in a data decompressor (not shown) during restoration, the macro blocks having the special STA code are searched for among previous and following segments. The excess bit amount is advantageously taken from the identified macro block and can be used to completely restore the data. On the other hand, the data of the identified macro block can be restored using the macro block which is located at the same position of the previous or following frame.

According to the present invention, when there are excessive bits remaining in the currently encoded segment, the same macro block is searched in a previous or following frame and the remaining bit amount is allocated in the identified macro block. Preferably, STA information of the macro block is used in the thus-identified macro block for normally restoring the original recording content.

Figure 15:
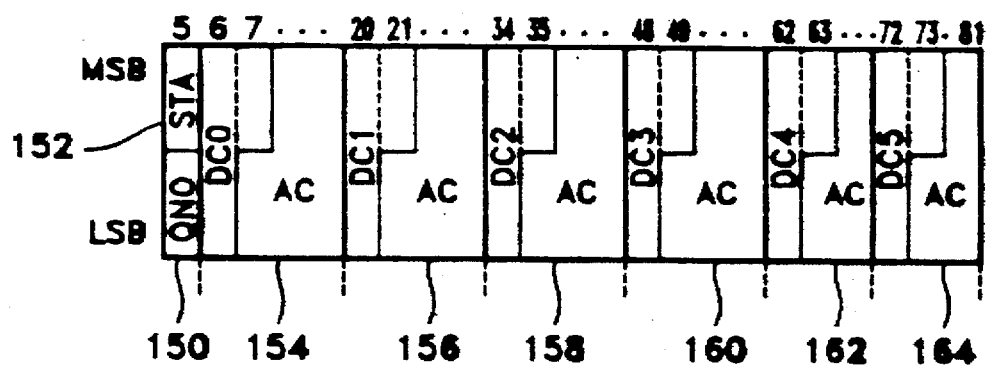
FIG. 15 is a diagram showing a data allocation in terms of a macro block of a segment.

FIG. 15 is an explanatory diagram showing data allocation in one macro block of a segment. In FIG. 15, the macro block includes a quantization number region 150, an STA region 152 first luminance block region 154, a second luminance block region 156, a third luminance block region 158, a fourth luminance block region 160, a first color difference block region 162 and a second color difference block region 164.

Quantization number region 150 and STA region 152 are each composed of four bits. First luminance block region 154, second luminance block region 156, third luminance block region 158 and fourth luminance block region 160 each have a recording capacity of fourteen bytes. Also, first color difference block region 162 and second color difference block region 164 each have a recording capacity of ten bytes. Finally, each macro block has a recording capacity of 77 bytes. The STA code is a four-bit code $(S_3, S_2, S_1, S_0)$ which is provided for an error concealment. The SD-VCR prescribes the following STA codes.

0000 There is no error in this block. Error concealment is not proceeded.

0010 There is no remaining error in this block. This block is replaced with a unit of the same unit number in the immediate previous frame. The continuity of data processing sequence with another block in the same video segment is guaranteed.

1010 There is no remaining error in this block. This block is replaced with a unit of the same unit number in the immediately previous frame. The continuity of data processing sequence with another block in the same video segment is not guaranteed.

0100 There is no remaining error in this block. This block is replaced with a unit of the same unit number in the next immediately following frame. The continuity of data processing sequence with another block in the same video segment is guaranteed.

1100 There is no remaining error in this block. This block is replaced with a unit of the same unit number in the next immediate frame. The continuity of data processing sequence with another block in the same video segment is not guaranteed.

0110 There is no remaining error in this block. This block is concealed, but the concealment method is not specified. The continuity of data processing sequence with another block in the same video segment is guaranteed.

1110 There is no remaining error in this block. This block is concealed, but the concealment method is not specified. The continuity of data processing sequence with another block in the same video segment is not guaranteed.

1111 An error exists in this block. The error position is unidentified.

0111 An error exist in this block. The error code is inserted in this block. This STA value is optional.

All other STA values are reserved.

According to the present invention, the searched macro block is error-processed using STA information, instead of recording the remaining bit amount therein. This ensures that the error-processed macro block is replaced with the macro block of the previous or following frame during restoration. As a result, compatibility with the SD-VCR can be maintained.

Preferably, the searching space for searching the macro block of a previous or following frame is limited to the space covered by the super block. As described in the shuffling method of FIG. 10, since the neighboring macro blocks in the same super block are shuffled into the neighboring segments, the searching space is limited to within the super block for actively searching a matching macro block during decoding.

According to the method for allocating the bit-stream in a preferred embodiment of the present invention, an STA code of "0010" or "0100" is used. When the macro block having the value ("0010" or "0100") is generated during decoding, a matching macro block is searched among the segments on the basis of the location of the macro block having the STA code. For the efficiency of the search algorithm, the searching range may be limited, for example, to ±8 segments.

According to the method for allocating the bit-stream in another preferred embodiment of the present invention, the location information for the macro block, which is matched with the region of a DCT block in which the DC coefficient is recorded, is recorded. That is, when the macro block (having an STA code whose value is "0010" or "0100") is generated during decoding, the region in each DCT block (for recording the DC coefficient) is read so that the matching macro block is searched.

In the two preferred embodiments described above, compatibility with the conventional SD-VCR is guaranteed. However, since an error may really be generated in the macro block, a method for recording a special identification code on quantization number information (QNO) can be considered by the way of precaution against such error generation.

According to the method for allocating the bit-stream in still another preferred embodiment of the present invention, the location of the matching macro block is designated using STA information. That is, the segment in which the matching macro block is located is designated by using STA information of the reserved region, other than "0010" and "0100," which is composed of a direction information bit and location information bits, as described above with respect to the prescribed STA codes.

Figure 16:
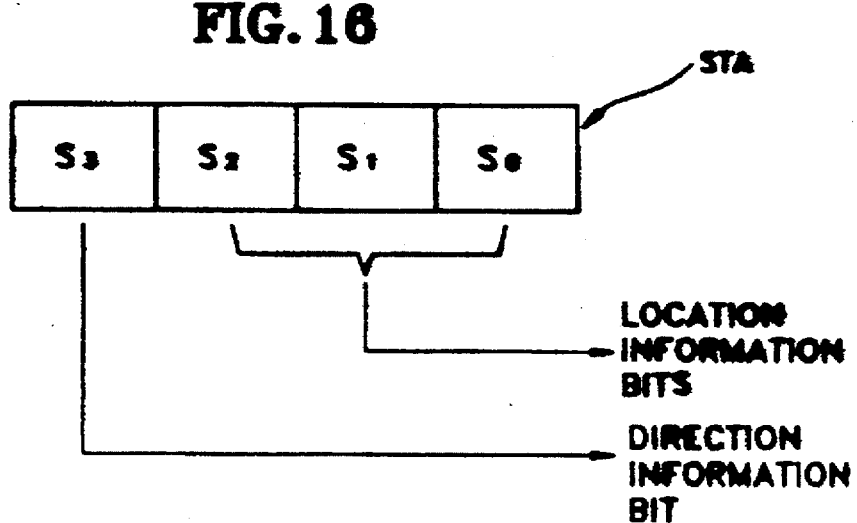
FIG. 16 is a diagram showing a method for constructing a STA code.

FIG. 16 is a diagram showing a method for constructing a STA code of still another preferred embodiment according to the present invention. Consider that the bits composing STA code are $S_3$, $S_2$, $S_1$ and $S_0$ from a most significant bit. Preferably, $S_3$ bit is used as the direction information bit indicating the forward or reverse search and the $S_2$ to $S_0$ bits are used as the location information bits.

In the case of still another preferred embodiment, compatibility with the conventional SD-VCR is guaranteed, but problems can be foreseen when an anticipated scale enlargement occurs in the future.

Figure 17:
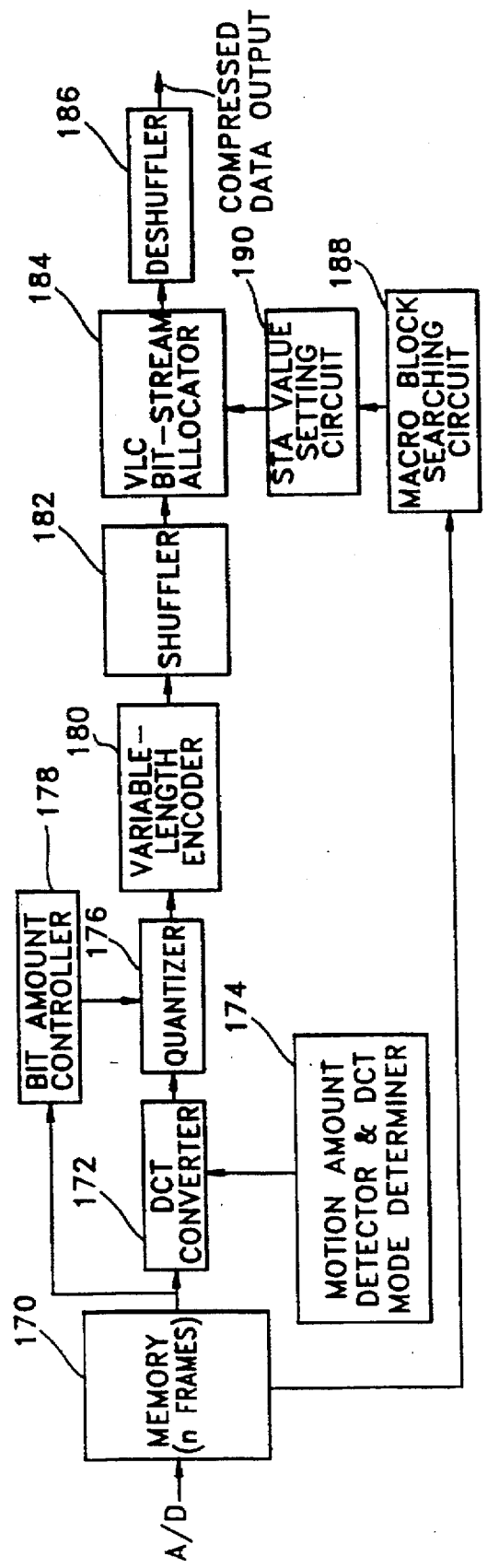
FIG. 17 is a block diagram showing a structure of a data compressor according to the present invention.

FIG. 17 is a block diagram showing a structure of a data compressor, suitable for the method for allocating the bit-stream according to the present invention. The data compressor shown in FIG. 17 includes a frame memory 170, a DCT converter 172, a motion amount detector and DCT mode determiner 174, a quantizer 176, a bit amount controller 178, a variable-length encoder 180, a shuffler 182, a VLC bit-stream allocator 184, a deshuffler 186, a macro block searching circuit 188 and a STA value setting circuit 190.

Macro block searching circuit 188 advantageously searches for a macro block having the same content in the searching region of a previous or following frame. STA value setting circuit 190 calculates the location difference between the macro block identified by macro block searching circuit 188 and the currently processed macro block, sets an STA value corresponding to the location difference, and provides the STA value to bit-stream allocator 184.

When the remaining bit amount exists after allocating the bit-stream by a segment unit, bit-stream allocator 184 allocates the remaining bit amount in a corresponding macro block of a segment having a macro block identified by macro block searching circuit 188. The STA code of the corresponding macro block is recorded as a value set-by STA value setting circuit 190.

Figure 18:
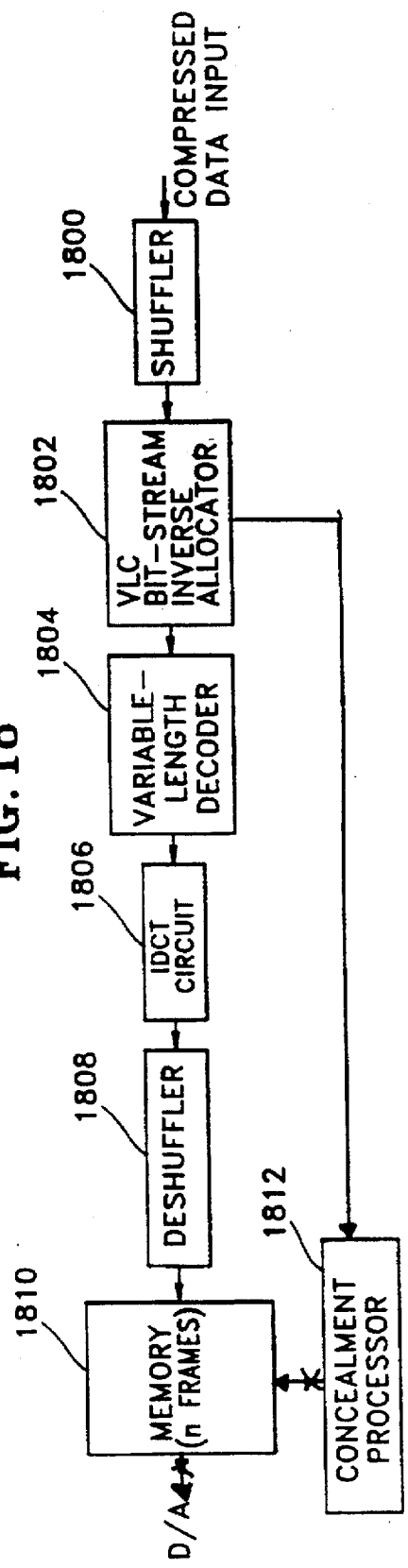
FIG. 18 is a block diagram showing a structure of a data decompressor according to the present invention.

FIG. 18 is a block diagram showing a structure of a data decompressor suitable for use with the data compressor shown in FIG. 17. The data decompressor preferably includes a shuffler 1800, a VLC bit-stream inverse allocator 1802, a variable-length decoder 1804, an inverse DCT (IDCT) circuit 1806, a deshuffler 1808, a frame memory 1810 and a concealment processor 1812.

Shuffler 1800 reconstructs a segment from the data reproduced by the reproducing circuit (not shown) and provides the reconstructed segment to VLC bit-stream inverse allocator 1802. VLC bit-stream inverse allocator 1802 extracts macro block information from the segments output from shuffler 1800, provides the extracted macro block information to variable-length decoder 1804 and outputs the STA information of each macro block. Variable-length decoder 1804 performs the variable length encoding by a macro block unit and provides the result to IDCT circuit 1806.

IDCT circuit 1806 restores the image signal of a time region by performing the IDCT conversion with respect to the variable-length-decoded data provided from variable-length decoder 1804 and provides the restored image signal to deshuffler 1808. Deshuffler 1808 returns the inverse-DCT-converted coefficient of a macro block unit to the initial position and provides the result to frame memory 1801.

Concealment processor 1812 receives STA information of a macro block output from VLC bit-stream inverse allocator 1802 and generates the location information of a macro block corresponding to the macro block in which an error is generated, in one of the previous or following frames.

Frame memory 1810 determines whether the error is generated in the macro block provided from deshuffler 1808, using information provided from concealment processor 1812. When an error is generated, the macro block in which the error is generated is replaced by the corresponding macro block of the previous or following frame. Frame memory 1810 outputs the error-corrected image data.

VLC bit-stream inverse allocator 1802 determines whether a bit amount which is not restored exists in the macro block of the segment provided from shuffler 1800. The existence of the bit amount which is not restored is determined by checking whether the recording space of each macro block ends with the EOB code. If the recording space ends with the EOB code, it means that the data of corresponding macro block can be completely restored. Otherwise, it is recognized that the remaining information is recorded in another segment.

According to a first restoring method, when the EOB code does not exist in the macro block of a segment, the macro block (including an STA code having the value of "0010" or "0100") is searched for in the segments included in the searching range. The insufficient bit amount is restored using the data recorded in the identified macro block. On the other hand, since the identified macro block does not have its own variable-length-encoded data, the identified macro block should be restored using the data of a corresponding macro block located in the previous or following frame. VLC bit-stream inverse allocator 1802 provides a segment number including the identified macro block and macro block number to concealment processor 1812.

According to a second restoring method, when the EOB code does not exist in the macro block of a segment, the macro block (including an STA code having the value of "0010" or "0100") is searched for in the segments of the searching range. It is then determined whether the macro block is matched with the macro block in which the remaining bit amount is generated. This is accomplished by using the location information recorded in the DC coefficient recording region of the identified macro block. When matched with the macro block in which the remaining bit amount is generated, the insufficient bit amount is restored using the data recorded in the AC coefficient recording region.

According to a third restoring method, when the EOB code does not exist in the macro block of a segment, the macro block (in which a reserved STA code is recorded) is searched in the segment of the searching range. It is then determined whether the macro block is matched with the macro block in which the remaining bit amount is generated, using the STA information of the searched macro block. When matched with the macro block in which the remaining bit amount is generated, the insufficient bit amount is restored using the data recorded in the AC coefficient recording region.

As described above, when the remaining bit amount is generated in a segment unit, the deterioration of the reproduced screen can be prevented by propagating the remaining bit amount to the neighboring segment and recording the remaining bit amount to the neighboring segment.

According to the method for allocating the bit-stream of the present invention, the deterioration of the reproduced screen can be prevented since the macro block of the previous or following frame is selected as a macro block for recording the remaining bit amount.

According to the method for allocating the bit-stream, compatibility with the conventional SD-VCR can be maintained by designating the macro block for recording the remaining bit amount using STA information.

In the method for allocating the bit-stream, compatibility with the conventional SD-VCR can be maintained by using the already set STA information among STA information of the macro block.

In the method for allocating the bit-stream, compatibility with the conventional SD-VCR can be maintained by using the reserved STA information among STA information of the macro block.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for allocating a bit-stream of a standard definition video cassette recorder (SD-VCR) into a fixed-length segment comprising a plurality of macro blocks each having a plurality of DCT blocks, wherein the bit-stream is generated as a result of quantizing and variable-length-encoding with respect to DCT coefficients of each one of the respective DCT blocks, said method comprising the steps of:

(a) allocating the bit-stream of each DCT block, generated as a result of the quantizing and variable-length encoding the DCT coefficients of each of the DCT blocks, to respective DCT blocks within a first of said macro blocks;

(b) reallocating remainder bits remaining after performing said step (a) to another respective one of said DCT blocks within said first of said macro blocks;

(c) reallocating residual bits remaining after preforming said step (b) to a second of said macro blocks within the segment;

(d) reallocating remnant bits remaining after said step (c) is performed to another segment having a corresponding macro block including the same content as that of one of a previous and a following frame.

2. The method for allocating a bit-stream of a SD-VCR according to claim 1, wherein step (d) comprises the steps of:

(d)(i) searching for the corresponding macro block having the same content as that of the respective macro block within the searching region of the currently encoded frame to thereby identify an identified macro block;

(d)(ii) error-processing a recording region corresponding to the identified macro block; and (d)(iii) reallocating said remnant bits remaining after performing said step (c), to the error-processed recording region.

3. The method for allocating a bit-stream of a SD-VCR according to claim 2, wherein the size of said searching region is less than or equal to a super block.

4. The method for allocating a bit-stream of a SD-VCR according to claim 2, wherein error-concealment information is used in said error-processing step.

5. The method for allocating a bit-stream of a SD-VCR according to claim 4, wherein said error-concealment information is STA information recorded in an STA region of an SD-VCR segment.

6. The method for allocating a bit-stream of a SD-VCR according to claim 5, wherein said STA information of said error-processing step has predetermined values of "0010" and "1100".

7. The method for allocating a bit-stream of a SD-VCR according to claim 5, wherein an STA signal other than "0000", "0010", "1010", "0100", "1100", "0110" and "0111" is used in said error-processing step.

8. The method for allocating a bit-stream of a SD-VCR according to claim 7, wherein at least one bit among bits comprising said STA signal is used as a direction information bit representing the one of the previous and the following frames and all other STA code bits of said STA signal are used as location information bits representing an offset from a current said segment to said another segment including said identified macro block.

9. The method for allocating a bit-stream of a SD-VCR according to claim 8, wherein said STA signal includes $S_0$, $S_1$, $S_2$ and $S_3$ bits, wherein said $S_3$ bit is said direction information bit and said $S_0$, said $S_1$ and said $S_2$ bits are said location information bits.

10. The method for allocating a bit-stream of a SD-VCR according to claim 4, wherein the location information of said segment in which said remnant bits are generated is recorded in a region for recording a DC coefficient of the macro block in which the remnant bits are reallocated.

11. A method for restoring a bit-stream of a standard definition video cassette recorder (SD-VCR), wherein the bit-stream is the result of quantizing and variable-length-encoding a DCT coefficient of a DCT block in an allocated segment after being classified into the levels of a DCT block, a macro block and a segment, said method comprising the steps of:

(a) determining whether a first macro block having an incomplete bit-stream exists in said segment;

(b) restoring the remaining bit-stream from another macro block in the segment when it is determined in step (a) that the first macro block having an incomplete bit-stream exists;

(c) searching for another segment having an error-processed macro block in a searching region when the first macro block having an incomplete bit-stream is not completely restored during step (b); and (d) restoring the incomplete bit-stream using the identified segment searched for in step (c), using the bit-stream included in said error-processed macro block.

12. The method for restoring a bit-stream of a SD-VCR according to claim 11, wherein said searching region is less than or equal to a super block.

13. A data compressing apparatus of a standard definition video cassette recorder (SD-VCR), for compressing a bit-stream generated as the result of quantizing and variable-length-encoding a DCT coefficient of a DCT block in an allocated segment after being classified into the levels of a DCT block, a macro block and a segment, said apparatus comprising:

a frame memory;

a DCT converter connected to said frame memory;

a motion amount detector and DCT mode determiner connected to said DCT converter;

a quantizer connected to said DCT converter;

a bit amount controller connecting said frame memory to said quantizer;

a variable-length encoder connected to said quantizer;

a shuffler connected to said variable-length encoder;

a bit-stream allocater and a deshuffler receiving an output of said shuffler;

macro block searching means for searching for a macro block having the same content in the searching region of one of previous and following frames; and macro block location difference value setting means for calculating the location difference between an identified macro block and the currently processed macro block for setting a macro block location difference value corresponding to the location difference and for providing the macro block location difference value to said bit-stream allocator, wherein said bit-stream allocator allocates the remaining bit amount in a corresponding macro block of a segment having the identified macro block searched for using said macro block searching means and records macro block location difference information of the corresponding macro block defining said macro block location difference value set by said macro block location difference value setting means, when the remnant bits exist after allocating the bit-stream within a segment unit.

14. The data compressing apparatus according to claim 13, wherein said macro block location difference value is an STA value recorded in an STA region of an SD-VCR segment.

15. A data decompressing apparatus of a standard definition video cassette recorder (SD-VCR), for decompressing a bit-stream generated as the result of quantizing and variable-length-encoding a DCT coefficient of a DCT block in an allocated segment after being classified into the levels of a DCT block, a macro block and a segment, comprising:

a shuffler for reconstructing a segment from the reproduced data;

a bit-stream inverse allocator for extracting the variable-length-encoded data in a unit of a macro block and the STA information of the macro block in which the error is generated, from the segments output from said shuffler;

a variable-length decoder for performing the variable-length decoding by receiving the variable-length-encoded data in a macro block unit output from said bit-stream inverse allocator;

inverse DCT means for restoring the image signal of a time region by performing the inverse DCT conversion with respect to the variable-length-decoded data provided from said variable-length decoder and providing the restored image signal;

a deshuffler for deshuffling the data of a macro block unit, inverse-DCT-converted by said inverse DCT circuit, to return the inverse-DCT-converted coefficient to the initial position and providing the result;

a concealment processor for receiving STA information of a macro block, in which an error is generated, output from said bit-stream inverse allocator and for generating location information of a macro block corresponding to the macro block in which an error is generated in one of previous and following frames; and a frame memory for determining whether the error is generated in the macro block provided from the deshuffler;

wherein the location information provided from said concealment processor is used for replacing the macro block in which an error is generated by the corresponding macro block of said one of said previous and said following frames when the error is generated, and providing the result.

* * * * *